United States Patent [19]
Hilti et al.

[11] Patent Number: 5,965,206
[45] Date of Patent: Oct. 12, 1999

[54] ANTISTATIC COMPOSITION

[75] Inventors: Bruno Hilti, Basel; Ernst Minder, Sissach; Jürgen Pfeiffer, Reinach; Markus Grob, Allschwil, all of Switzerland

[73] Assignee: Ciba Specialty Chemicals Corporation, Tarrytown, N.Y.

[21] Appl. No.: 08/925,015

[22] Filed: Sep. 8, 1997

[30] Foreign Application Priority Data

Sep. 16, 1996 [CH] Switzerland ............... 2258/96

[51] Int. Cl.$^6$ ....................................... B05D 1/00
[52] U.S. Cl. ................ 427/393.1; 428/357; 524/405; 524/415; 524/423; 524/436; 524/911
[58] Field of Search ............... 428/357; 427/393.1; 524/911, 405, 415, 423, 436

[56] References Cited

U.S. PATENT DOCUMENTS

| | | | |
|---|---|---|---|
| 3,661,501 | 5/1972 | Corbett et al. | 427/393.1 |
| 3,717,689 | 2/1973 | Tanaka et al. | 427/393.1 |
| 3,779,881 | 12/1973 | Sakurada et al. | 427/393.1 |
| 4,065,598 | 12/1977 | Takahashi et al. | 427/393.1 |
| 4,855,077 | 8/1989 | Shikinami et al. | 252/518 |
| 4,861,663 | 8/1989 | Sirinyan et al. | 427/393.1 |
| 5,190,819 | 3/1993 | Landry et al. | 428/357 |
| 5,202,205 | 4/1993 | Malhota | 427/393.1 |

FOREIGN PATENT DOCUMENTS

| | | |
|---|---|---|
| 0555197 | 8/1993 | European Pat. Off. . |
| 0613919 | 9/1994 | European Pat. Off. . |
| 0789049 | 8/1997 | European Pat. Off. . |
| 4031818 | 4/1992 | Germany . |
| 4316607 | 11/1994 | Germany . |
| 4324062 | 1/1995 | Germany . |
| 93/24555 | 12/1993 | WIPO . |

OTHER PUBLICATIONS

Derwent Abst. for DE 4324062.
Derwent Abst. for DE 4316607.
Derwent Abst. for DE 4031818.
Translation of Hei 4–348150 of May 27, 1991.
Translation of Hei 5–202239 of Aug. 10, 1993.

*Primary Examiner*—Veronica P. Hoke
*Attorney, Agent, or Firm*—David R. Crichton; Luther A. R. Hall

[57] ABSTRACT

The invention relates to a composition that comprises a thermoplastic or elastomeric polymeric substrate (A) and an antistatic mixture (B) in the form of contiguous fibers, which mixture comprises (b1) an organic polymeric material that is fibrous or forms fibers on mixing and is not soluble in the thermoplastic or elastomeric polymeric substrate (A); (b2) a polymer or copolymer capable of ion conduction that has blocks for complexing or solvating a salt of an inorganic or low-molecular-weight organic protonic acid (b3) and has a better compatibility with the organic polymer (b1) that is fibrous or forms fibers on mixing than with the polymeric organic substrate (A); and (b3) a salt of an inorganic or low-molecular-weight organic protonic acid such as $NaClO_4$ or $KPF_6$ that has been complexed or solvated in the polymer or copolymer (b2). The invention relates also to the antistatic mixture (B) as such, to its use in rendering polymers antistatic and to a process for the preparation of antistatic thermoplastic or elastomeric polymeric substrates.

14 Claims, No Drawings

ANTISTATIC COMPOSITION

The invention relates to a composition comprising a thermoplastic or elastomeric polymeric substrate (A) and an antistatic mixture (B) in the form of contiguous fibres, which mixture comprises (b1) an organic polymeric material that is fibrous or forms fibres on mixing and is not soluble in the thermoplastic or elastomeric polymeric substrate (A); (b2) a polymer or copolymer capable of ion conduction that has blocks for complexing or solvating a salt of an inorganic or low-molecular-weight organic protonic acid (b3) and has a better compatibility with the organic polymer (b1) that is fibrous or forms fibres on mixing than with the polymeric organic substrate (A); and (b3) a salt of an inorganic or low-molecular-weight organic protonic acid that has been complexed or solvated in the polymer or copolymer (b2). The invention relates also to the antistatic mixture (B) itself, to its use for rendering polymers antistatic and to a process for the preparation of antistatic thermoplastic or elastomeric polymeric substrates.

It is known that polymers are subject to a strong electrostatic charge and that charges, once applied, can be discharged only slowly because of the low electrical conductivity of polymers. Rapid discharging is required not only for aesthetic reasons but also, in many cases, for reasons of safety. The following adverse effects in use may be mentioned: soiling of polymer surfaces, electrical shocks to persons touching polymers, disruption of production caused by the adhesion of film webs, destruction of electronic components, lump formation in polymer powders, and sparking, caused by charges being too high, with subsequent ignition, which has already frequently resulted in serious explosions.

It is known to limit static charging by the addition of additives that improve surface conductivity, but such substances have the disadvantage of being ineffective in practice when atmospheric humidity is low. It is therefore better to use additives that are effective at low atmospheric humidity, which can usually be achieved by increasing the volume conductivity. The known substances for increasing volume conductivity, for example carbon black or metal powder, however, alter the mechanical properties of the polymers and cannot be used for transparent polymers. In addition, there is an increasing requirement for additives to be ecologically unobjectionable.

Further details relating to antistatic additives and the mechanism of static charging may be found, for example, in the "Plastics Additives Handbook", editors R. Gächter and H. Müller, Hanser Verlag, 3rd edition, 1990, pages 749–775.

In order to render materials permanently antistatic, it has already been proposed in DE-A-4 324 062 to coat materials that have a large surface area, such as fibres, with a semi-conductive colourless material, for example tin oxide. The coated material may then be admixed and processed with the polymer granules. However the preparation of the coating is complex, since the semi-conductive combination has to be made by impregnating fibrous carriers with an aqueous salt solution, subsequently drying and then thermally conditioning the deposited salt. That chemical and thermal processing applied to the fibres may damage the fibres, which may result in a lower conductivity than was to have been expected from the conductivity of the semi-conductors. A further disadvantage is that the fibres bend as a result of mechanical stress, and the brittle semi-conductor coating may become damaged, thereby also impairing the conductivity.

A further possibility is described in DE-A-4 316 607, which proposes adding commercially available metallised synthetic fibres to lubricants, adhesives or coating materials, thereby increasing their electrical conductivity. Metallised fibres are relatively expensive and complicated to produce, however, and markedly reduce the transparency of the polymer into which they are incorporated. In addition, mechanical damage to the conductive layer and even to the fibres (fracture) cannot be completely avoided.

In EP-A-0 613 919 certain polyether ester amides are proposed as antistatic additives for thermoplastic polymers. In specific embodiments, alkali metal or alkaline earth metal halides may be added in addition. The addition also of a polymer that provides compatibility between the thermoplastic substrate and the polyether ester amide is proposed, in order to improve adhesion and mechanical properties. In the concept proposed therein for rendering the polymers antistatic, compatibility and good miscibility of the polymers appear to be important properties.

In view of the above-mentioned limitations of the known methods of rendering polymers antistatic, there continues to be a need for an antistatically active, ecologically unobjectionable additive system for increasing volume conductivity that is effective at low atmospheric humidity, which system is simple to produce, can easily be incorporated into or mixed with the polymer, retains over a long period the volume conductivity of the polymer achieved and, without any notable restriction, can be used in small amounts in all commercially available polymers.

It has now been found that a fibre-forming or fibrous organic polymeric material together with a further polymer or copolymer capable of ion conduction can be so incorporated into a thermoplastic or elastomeric substrate that the polymer or copolymer is substantially adsorptively bound to the fibre or dissolved in it and together with it forms a network in the thermoplastic or elastomeric substrate in which the fibre is not soluble. A portion of the polymer or copolymer capable of ion conduction has polar groups that are capable of complexing or solvating a salt of an inorganic or organic protonic acid.

The fibrous or fibre-forming organic polymeric material must be so selected that it does not dissolve in the thermoplastic or elastomeric substrate but is able to form a net-like structure of contiguous fibres.

For good electrical conductivity it is advantageous for the fibres of the organic material to be contiguous with one other or to cross one another at as many sites as possible once they have been incorporated in the polymer. By that means electrically conductive paths are formed through which the charges can flow away.

Since the fibres and the polymers or copolymers capable of ion conduction are high-molecular-weight compounds, there is also virtually no risk of their being exuded, with the result that the antistatic property is especially durable. The stability properties of the polymer, such as thermostability and resistance to light and hydrolysis, are in most cases virtually unaffected.

When the amounts added are small, the optical properties are modified only slightly and transparent materials remain substantially transparent, which is of great importance for many fields of use.

The invention relates to a composition comprising a thermoplastic or elastomeric polymeric substrate (A) and an antistatic mixture (B) in the form of contiguous fibres, which mixture comprises (b1) an organic polymeric material that is fibrous or forms fibres on mixing and is not soluble in the thermoplastic or elastomeric polymeric substrate (A); (b2) a polymer or copolymer capable of ion conduction that has blocks for complexing or solvating a salt of an inorganic or low-molecular-weight organic protonic acid (b3) and has a better compatibility with the organic polymer (b1) that is fibrous or forms fibres on mixing than with the polymeric organic substrate (A); and (b3) a salt of an inorganic or low-molecular-weight organic protonic acid that has been complexed or solvated in the polymer or copolymer (b2).

Examples of thermoplastic or elastomeric polymers are listed below.

1. Polymers of mono- and di-olefins, for example polypropylene, polyisobutylene, poly-butene-1, poly-4-methylpentene-1, polyisoprene or polybutadiene and also polymerisates of cyclo-olefins, such as, for example, of cyclopentene or norbornene; and also polyethylene (which may optionally be cross-linked), for example high density polyethylene (HDPE), low density polyethylene (LDPE), linear low density polyethylene (LLDPE), branched low density polyethylene (BLDPE).

Polyolefins, that is to say polymers of mono-olefins, as mentioned by way of example in the preceding paragraph, especially polyethylene and polypropylene, can be prepared by various processes, especially by the following methods:

a) radically (usually at high pressure and high temperature);

b) by means of catalysts, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either p- or s-coordinated. Those metal complexes may be free or fixed to carriers, such as, for example, to activated magnesium chloride, titanium(III) chloride, aluminium oxide or silicon oxide. Those catalysts may be soluble or insoluble in the polymerisation medium. The catalysts can be active as such in the polymerisation or further activators may be used, such as, for example, metal alkyls, metal hydrides, metal alkyl halides, metal alkyl oxides or metal alkyl oxanes, the metals being elements of group(s) Ia, IIa and/or IIIa. The activators may be modified, for example, with further ester, ether, amine or silyl ether groups. Those catalyst systems are usually known as Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, such as, for example, ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/-octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, such as, for example, polyamides.

4. Hydrocarbon resins (for example $C_5$–$C_9$) including hydrogenated modifications thereof (for example tackifier resins) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, such as, for example, styrene/butadiene, styrene/acrylonitrile, styrene/alkyl methacrylate, styrene/-butadiene/alkyl acrylate and methacrylate, styrene/maleic acid anhydride, styrene/-acrylonitrile/methyl acrylate; high-impact-strength mixtures consisting of styrene copolymers and another polymer, such as, for example, a polyacrylate, a diene polymer or an ethylene/-propylene/diene terpolymer; and also block copolymers of styrene, such as, for example, styrene/butadiene/styrene, styrene/isoprene/styrene, styrene/ethylene-butylene/styrene or styrene/ethylene-propylene/styrene.

7. Graft copolymers of styrene or $\alpha$-methylstyrene, such as, for example, styrene on poly-butadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, such as, for example, polychloroprene, chlorocaoutchouc, chlorinated or chlorosulfonated polyethylene, copolymers of ethylene and chlorinated ethylene, epichlorohydrin homo- and co-polymers, especially polymers of halogen-containing vinyl compounds, such as, for example, polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from $\alpha,\beta$-unsaturated acids and derivatives thereof, such as poly-acrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, such as, for example, acrylonitrile/butadiene copolymers, acrylonitrile/alkyl acrylate copolymers, acrylonitrile/alkoxyalkyl acrylate copolymers, acrylonitrile/-vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers such as, for example, ethylene oxide; polyacetals that are modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxy groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6,6, 6,10, 6,9, 6,12, 4,6, 12,12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethyleneterephthalamide or poly-m-phenyleneisophthalamide. Block copolymers of the above-mentioned polyamides with polyolefins, olefin copolymers, ionomers or chemically bonded or grafted elastomers; or with polyethers, such as, for example, with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxy terminal groups; and also polyesters modified with polycarbonates or MBS.

19. Polycarbonates and polyester carbonates.

20. Polysulfones, polyether sulfones and polyether ketones.

21. Natural polymers, such as natural rubber, or polymer-homologously chemically modified derivatives of cellulose, such as cellulose acetates, propionates and butyrates, and the cellulose ethers, such as methyl cellulose.

22. Mixtures (polyblends) of the afore-mentioned polymers, such as, for example, PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6,6 and copolymers, PA/HDPE, PA/PP, PA/PPO.

Preferably, the thermoplastic or elastomeric polymeric substrate (A) is a polyolefin, a polystyrene, a copolymer of acrylonitrile/butadiene/styrene (ABS), a polymer of $\alpha,\beta$-unsaturated acids, a halogen-containing polymer, a homo- or co-polymer of cyclic ethers, a polymer of unsaturated alcohols and amines, a polyacetal, a polyphenylene oxide, a polyurethane, a polyamide, a polyester, a polyurea, a polycarbonate, a polysulfone or natural rubber.

The thermoplastic or elastomeric polymeric substrate (A) is especially a polyolefin, a polystyrene, an acrylonitrile/butadiene/styrene (ABS) copolymer, a polymer of $\alpha,\beta$-unsaturated acids, a halogen-containing polymer or a homo- or co-polymer of cyclic ethers.

The thermoplastic or elastomeric polymeric substrate (A) is more especially polyvinyl chloride (PVC), polystyrene, polyethylene in its various modifications, or polypropylene.

The fibrous or fibre-forming organic polymeric material (b1) may already be in the form of long spun fibres or in the form of cut staple fibres, and may be used in that form. It is also possible for the fibres that are present to be used in the form of a planar network, a woven pattern, a non-woven fabric or a felt.

The fibrous or fibre-forming organic polymeric material (b1) is preferably in the form of synthetically produced polymer fibres.

Examples of suitable fibrous or fibre-forming organic polymeric materials are polyamides and copolyamides, polyesters, polyvinyl acetate, polyvinyl alcohol, modified cellulose, polyacrylic acid esters, polymethacrylic acid esters, polyacrylonitrile, modacryl (copolymer of acrylonitrile and vinyl chloride), polyolefins, polyanhydrides, polyester amides, polyphenylene sulfide, polyfluorohydrocarbons, polyurethane and polyurea.

Preferably, the fibres comprise the polymer or copolymer (b2) capable of ion conduction at the surface or over the cross-section and they are contiguous with one another in the polymer matrix, since by that means the volume conductivity may occur by way of ions.

The fibrous organic material generally has a length of from 0.01 to 200 mm, preferably from 0.1 to 20 mm. It may be in the form of macroscopic fibres, but also small fibrils having microscopic cavities may be present.

It is also possible, however, to use the fibrous or fibre-forming organic polymeric material in the form of granules or powder. When mixing and processing with the polymeric substrate, for example in calenders, three-roll mills, extruders or kneaders, a fibrous or fibrillar alignment is achieved as a result of the fibre-forming organic polymeric material not being soluble in the substrate polymer and extending substantially in one dimension owing to the processing or mixing process. The result can, if desired, be further improved by a subsequent additional drawing process. Methods of mixing and processing thermoplastic or elastomeric polymers are known to the person skilled in the art and are described, for example, in Kunststoff-Taschenbuch, 12th edition, Hanser Verlag 1979, pages 35–195.

The fibrous polymeric material (or polymeric material which forms fibres on mixing) (b1) is preferably a polyacrylic acid ester, a polymethacrylic acid ester, a polyacrylonitrile, a polyvinyl alcohol, a polyvinyl acetate, a polyamide, a polyurethane or a polyester.

The fibrous polymeric material (or polymeric material which forms fibres on mixing) (b1) is especially a polyester, polyamide (x) or polyamide (x,y) in which x and y are each independently a number from 4 to 14.

It is more especially polyamide 4,6, polyamide 6,6, polyamide 6 or the copolyamide 6/6,6.

A large number of fibrous or fibre-forming polymers are available commercially. If material that is already fibrous is used, then the material may be selected in various fibre thicknesses. Fibre thicknesses are usually quoted in dtex (g/10000 m). Fibre thicknesses of from 0.5 to 500 dtex are typical, with the use of fibre thicknesses of from 1 to 100 dtex being preferred.

Preferred polymers or copolymers (b2) are oligoethoxylated acrylates or methacrylates, styrene oligoethoxylated at the aromatic ring, polyether urethanes, polyether ureas, polyether amides, polyether ester amides and polyether esters. The copolymers may be random copolymers or block copolymers, with block copolymers being preferred (claim 7).

Polyether amides and polyether ester amides are especially preferred.

A block copolymer is especially a polyether ester amide in which the polyether segments consist of polyethylene glycol units having a molecular weight $M_n$ of from 200 to 6000 daltons and the polyamide segments consist of polyamide (x) or polyamide (x,y) having a molecular weight $M_n$ of from 200 to 6000 daltons, x and y being a number from 4 to 14.

Suitable polyether ester amides are described, for example, in EP-A-613 919.

Other equally well suited polyether ester amides and the preparation thereof are described in DE-OS-25 23 991.

Polymers or copolymers according to the invention are commercially available or may be prepared, for example, in accordance with a process described in EP-A-613 919 or DE-OS-25 23 991.

An important prerequisite in the choice of the polymers or copolymers (b2) in conjunction with the fibrous or fibre-forming material (b1) is that the two have a higher affinity for each other than for the thermoplastic or elastomeric polymeric substrate. This can be achieved, for example, by part of each of them having the same polymeric skeleton. Examples include the cases in which (b1) consists of polyamide and (b2) consists of polyether ester amide, (b1) consists of polyester and (b2) consists of polyether ester amide or polyether ester, (b1) consists of acrylonitrile and (b2) consists of oligoethoxylated acrylate or methacrylate, and the thermoplastic or elastomeric polymeric substrate (A) is, for example, a polyolefin or PVC.

Preferably, the inorganic or low-molecular-weight organic salt (b3) is an alkali metal, alkaline earth metal, zinc or ammonium salt of an inorganic or low-molecular-weight organic protonic acid.

Low-molecular-weight organic protonic acids are, for example, those having from 1 to 4 carbon atoms. Examples are acetic acid, trifluoroacetic acid, methanesulfonic acid and trifluoromethanesulfonic acid.

Especially preferred are the inorganic salts (b3) $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Mg(ClO_4)_2$, $Mg(CF_3SO_3)_2$, $Zn(ClO_4)_2$, $Zn(PF_6)_2$ and $Ca(CF_3SO_3)_2$.

The salts may occur in various hydrated forms and may be used with or without water of hydration.

The salt (b3) is present preferably in an amount of from 0.05 to 10% by weight, especially in an amount of from 0.5 to 5% by weight, based on the copolymer (b2).

The ratio by mass of organic polymeric material (b1) that is fibrous or forms fibres on mixing to copolymer (b2) is preferably from 20:1 to 1:10, especially from 10:1 to 1:3. (claims 13, 14).

The antistatically active mixture of components (b1), (b2) and (b3) is present preferably in a total amount of from 0.1 to 15% by weight, especially from 1 to 15% by weight and more especially from 5 to 15% by weight based on the thermoplastic or elastomeric polymeric substrate.

A preferred composition according to the invention comprises as thermoplastic or elastomeric polymeric substrate (A) PVC, polyethylene or polypropylene, as fibrous or fibre-forming organic polymeric matrial (b1) a polyester or a polyamide, as copolymer (b2) capable of ion conduction a polyether ester amide or a polyether ester, and as inorganic salt of a protonic acid (b3) $NaClO_4$, $KPF_6$ or $LiCF_3SO_3$.

The thermoplastic or elastomeric polymeric substrate and the fibrous polymeric material (or polymeric material that forms fibres on mixing) may comprise further additives. Those further additives belong especially to the group of the antioxidants, UV absorbers and/or light stabilisers. The thermal stabilisation covers both processing and use (long-term stability). Those further additives are known to the person skilled in the art and are for the most part commercially available.

If antistatic halogen-containing polymers are used, such as are described above, then they advantageously comprise in addition at least one inorganic zinc, barium, cadmium, aluminium, calcium, magnesium or rare earth compound, such as zinc oxide, hydroxide, chloride or sulfide, or a superbasic zinc oxide/hydroxide addition compound, or an organic zinc, barium, cadmium, aluminium, calcium, magnesium or rare earth compound from the series of the aliphatic saturated $C_2$–$C_{22}$carboxylates, the aliphatic unsaturated $C_3$–$C_{22}$-carboxylates, the aliphatic $C_2$–$C_{22}$carboxylates that are substituted by at least one OH group or the chain of which is interrupted at least by one oxygen atom (oxa acids), the cyclic and bicyclic carboxylates having from 5 to 22 carbon atoms, the phenyl carboxylates unsubstituted, substituted by at least one OH group and/or substituted by $C_1$–$C_{16}$alkyl, the naphthylcarboxylates unsubstituted, substituted by at least one OH group and/or by $C_1$–$C_{16}$-alkyl, the phenyl-$C_1$–$C_{16}$alkylcarboxylates, the naphthyl-$C_1$–$C_{16}$alkylcarboxylates or the unsubstituted or $C_1$–$C_{12}$alkyl-substituted phenolates.

The mentioned metal compounds may be in the form of mixtures of various compounds. Preferred are so-called synergistic metallic soap mixtures, for example of the metals Ca and Zn or Ba and Zn. Organic zinc, barium, cadmium, aluminium, calcium, magnesium or rare earth compounds may also be coated onto a hydrotalcite, zeolite or dawsonite; see in this connection also DE-A-4 031 818.

Suitable antioxidants are, for example:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl)-4,6-dimethylphenol, 2,6-di-octadecyl-4-methylphenol, 2,4,6-tricyclohexylphenol, 2,6-di-tert-butyl-4-methoxymethylphenol, 2,6di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol, octylphenol, nonylphenol and mixtures thereof.

2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

4. Hydroxylated thiodiphenyl ethers, for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxyphenyl) disulfide.

5. Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methyl-benzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercapto-butane, 1,1,5,5-tetra(5-tert-butyl-4-hydroxy-2-methylphenyl)pentane.

6. O-, N- and S-benzyl compounds, for example 3,5,3',5'-tetra-tert-butyl-4,4'-dihydroxy-dibenzyl ether, octadecyl-4-hydroxy-3,5-dimethylbenzyl-mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulfide, isooctyl-3,5-di-tert-butyl-4-hydroxybenzyl-mercaptoacetate.

7. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl) malonate, di-[4-(1,1,3,3-tetramethylbutyl)-phenyl]-2,2-bis(3,5-di-tert-butyl-4-hydroxybenzyl) malonate.

8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetra-methylbenzene, 2,4,6-tris(3,5-di-tert-butyl-4-hydroxybenzyl)-phenol.

9. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

10. Phosphonates, phosphites and phosphonites, for example dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoethyl ester, triphenylphosphite, diphenylalkylphosphites, phenyidialkylphosphites, tris(nonylphenyl)phosphite, trilaurylphosphite, trioctadecylphosphite, distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl-sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]1,3,2-dioxaphosphocine, bis(2,4-di-tert-butyl-6-methylphenyl) methylphosphite, bis(2,4-di-tert-butyl-6-methylphenyl) ethylphosphite, $(C_9H_{19}-C_6H_4)_{1.5}$-P-$(O-C_{12-13}H_{25-27})_{1.5}$.

11. Acylaminophenols, for example 4-hydroxylauric acid anilide, 4-hydroxystearic acid anilide, N-(3,5-di-tert-butyl-4-hydroxyphenyl)carbamic acid octyl ester.

12. Esters of β-(3,5-di-tert-butyl-4-hydroxyphenyl)-propionic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

13. Esters of β-(5-tert-butyl-4-hydroxy-3-methylphenyl)-propionic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(3,5-dicyclohexyl-4-hydroxyphenyl)-propionic acid with mono- or poly-hydric alcohols, such as, for example, with methanol, ethanol, octanol, octadecanol, 1,6-hexane-diol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

15. Esters of 3,5-di-tert-butyl-4-hydroxyphenylacetic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Amides of β-(3,5-di-tert-butyl-4-hydroxyphenyl) propionic acid, such as, for example, N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

17. Esters of thiodiacetic acid and thiodipropionic acid

Preferred are antioxidants of groups 5, 10 and 14, especially 2,2-bis(4-hydroxyphenyl)propane, esters of 3,5-di-tert-butyl-4-hydroxyphenylpropionic acid with octadecanol or pentaerythritol or tris-(2,4-di-tert-butylphenyl)-phosphite.

If desired, a mixture of antioxidants of different structures may also be used.

The antioxidants may be used in an amount of, for example, from 0.01 to 10, advantageously from 0.1 to 10, and especially from 0.1 to 5, parts by weight, based on 100 parts by weight of polymer.

Suitable UV-absorbers and light stabilisers are, for example:

1. 2-(2'-Hydroxyphenyl)-benzotriazoles, such as, for example, 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chloro-benzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)-benzotriazole, mixture of 2-(3'-tert-butyl-2'-hydroxy-5'-(2-octyloxycarbonylethyl) phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6benzotriazol-2-yl-phenol]; transesterification product of 2-[3'-tert-butyl-5'-(2-methoxycarbonylethyl)-2-hydroxyphenyl]-benzotriazole with polyethylene glycol 300; [R—CH$_2$CH$_2$—COO(CH$_2$)$_3$]— in which R═3'-tert-butyl-4'-hydroxy-5'-2H-benzotriazol-2-yl-phenyl.

2. 2-Hydroxybenzophenones, such as, for example, the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

3. Esters of unsubstituted or substituted benzoic acids, such as, for example, 4-tert-butyl-phenylsalicylate, phenylsalicylate, octylphenylsalicylate, dibenzoylresorcinol, bis(4-tert-butylbenzoyl)resorcinol, benzoylresorcinol, 3,5-di-tert-butyl-4-hydroxybenzoic acid 2,4-di-tert-butyl-phenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

4. Acrylates, such as, for example, α-cyano-β,β-diphenylacrylic acid ethyl ester or isooctyl ester, α-methoxycarbonyl-cinnamic acid methyl ester, α-cyano-β-methyl-p-methoxy-cinnamic acid methyl ester or butyl ester, α-methoxycarbonyl-p-methoxy-cinnamic acid methyl ester, N-(β-methoxycarbonyl-β-cyanovinyl)-2-methyl-indoline.

5. Nickel compounds, such as, for example, nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyl-diethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

6. Sterically hindered amines, such as, for example, bis(2,2,6,6-tetramethyl-piperidyl)sebacate, bis(2,2,6,6-tetramethylpiperidyl)succinate, bis(1,2,2,6,6-pentamethylpiperidyl)sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis-(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, condensation product of N,N'-bis(2,2,6,6-tetramethyl-4-piperidyl)-hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine2,5-dione, and Chimassorb966.

7. Oxalic acid diamides, such as, for example, 4,4'-dioctyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyloxanilide, N,N'-bis(3-dimethylaminopropyl)oxalamide, 2-ethoxy-5-tert-butyl-2'-ethyl-oxanilide and a mixture thereof with 2-ethoxy-2'-ethyl-5,4'-di-tert-butyl-oxanilide, mixtures of o- and p-methoxy- and of o- and p-ethoxy-di-substituted oxanilides.

8. 2-(2-Hydroxyphenyl)-1,3,5-triazines, such as, for example, 2,4,6-tris(2-hydroxy-4-octyloxyphenyl)-1,3,5-triazine, 2-(2-hydroxy-4-octyloxyphenyl)-4,6bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)-phenyl]-4,6-bis(2,4-dimethylphenyl)-1,3,5-triazine, 2-[2-hydroxy-4-(2-hydroxy-3-octyloxypropyloxy) phenyl]-4,6-bis(2,4-dimethylphenyl)-1,3,5-triazine.

Suitable peroxide-destroying compounds are, for example: esters of β-thio-dipropionic acid, for example lauryl, stearyl, myristyl or tridecyl esters, mercaptobenzimidazole, the zinc salt of 2-mercaptobenzimidazole, zinc dibutyl-dithiocarbamate, dioctadecyl disulfide, pentaerythritol-tetrakis(β-dodecylmercapto)propionate and ethylene glycol bismercaptoacetate.

The invention relates also to an antistatic mixture (B) comprising (b1) an organic polymeric material that is fibrous or forms fibres on mixing and is not soluble in the thermoplastic or elastomeric polymeric substrate (A);

(b2) a polymer or copolymer capable of ion conduction that has blocks for complexing or solvating a salt of an inorganic or low-molecular-weight organic protonic acid (b3) and has a better compatibility with the fibrous or fibre-forming organic polymer than with the polymeric organic substrate (A); and (b3) a salt of an inorganic or low-molecular-weight organic protonic acid that has been complexed or solvated in the polymer or copolymer (b2).

The definitions and preferred definitions given above apply to the organic polymeric material (b1) that is fibrous or forms fibres on mixing, to the polymer or copolymer (b2) capable of ion conduction, and to the salt of an inorganic or low-molecular weight organic protonic acid (b3). The mixture may also comprise the above-described further components.

In addition to the antistatic mixture according to the invention, further known antistatically active compounds may be present. Such antistatic agents are known in large numbers and are described, for example, in Kunststoffe 67 (1977) 3, pages 154–159.

The antistatic agents may be, for example, polyoxyalkylene compounds. Examples are polypropylene glycol lauryl ester, polypropylene glycol oleyl ether, polypropylene glycol methyldiethylammonium chloride, polyethylene glycol monomethyl ether, polyethylene glycol dimethyl ether, polyethylene glycol lauryl ester, polyethylene glycol oleyl ester, polyethylene glycol oleyl ether, polyethylene glycol sorbitan monolauryl ester, polyethylene glycol stearyl ester, polyethylene glycol polypropylene glycol lauryl ether, polyethylene glycol lauryl ether carboxylic acid, polyethylene glycol diacrylate, monoacrylate and triacrylate and polyethylene glycol dimethacrylate, monomethacrylate and trimethacrylate.

If an olefinically unsaturated compound is used, it may be polymerised or crosslinked on the fibres.

The invention relates also to a process for the preparation of an antistatic thermoplastic or elastomeric polymeric substrate (A), which process comprises incorporating an antistatic mixture (B) comprising (b1) an organic polymeric material that is fibrous or forms fibres under the mixing conditions and is not soluble in the thermoplastic or elastomeric polymeric substrate (A), (b2) a polymer or copolymer capable of ion conduction that has blocks for complexing or solvating a salt of an inorganic or low-molecular-weight organic protonic acid (b3) and has a better compatibility with the fibrous or fibre-forming organic polymeric material (b1) than with the thermoplastic or elastomeric polymeric organic substrate (A), and (b3) a salt of an inorganic or low-molecular-weight organic protonic acid that has been complexed or solvated in the polymer or copolymer (b2), as it is or in the form of its individual components, in any sequence, and, if desired, further additives, with a thermoplastic or elastomeric polymer (A), the fibres that are present or that are formed being contiguous with one another.

The preparation may be carried out in a manner known per se by mixing the said components and, if desired, further additives with the polymer using devices known per se, such as calenders, mixers, kneaders, extruders and the like. The additives may be added individually or in admixture with one another. It is also possible to use so-called master batches.

An antistatic thermoplastic polymer obtainable according to the present invention can be made into the desired form in known manner. Such processes include, for example, grinding, calendering, extruding, injection-moulding, sintering, compression/sintering or spinning, also extrusion blow-moulding, or processing according to the plastisol method. The antistatic thermoplastic polymer may also be processed to form foamed materials.

The invention relates also to the use of an antistatic mixture according to the invention for rendering thermoplastic or elastomeric polymers antistatic.

The polymer composition according to the invention is suitable especially for wire coverings and cable insulations. Decorative films, foamed materials, agricultural fleece, tubes, sealing profiles and office films may, however, also be produced. The polymer compositions according to the invention may also be used as moulding compositions for the production of hollow articles (bottles) packaging films (deep-drawn film), blown films, crash pad films (automobiles), pipes, foamed materials, heavy-duty profiles (window frames), profiles for illuminated walls, building profiles, sidings, fittings, office films and apparatus housings (computers, domestic appliances).

The following Examples illustrate the invention.

EXAMPLE 1
Preparation of Antistatic Hard PVC 60 g of hard PVC according to DIN 53774, Vinnole® of Wacker Chemie, 2.1 g of polyether ester amide (Pelestat® 7490, of Sanyo Chemicals) to which 3% by weight of $NaClO_4.H_2O$ has been added, and 4.0 g of polyamide 6,6 flocks (length 1.5 mm, 2.2 dtex) are mixed using a spatula. The mixture is processed on a two-roll calender at 190° C. (rolling time 5 minutes, speed 26/33 revs/min, nip 0.5 mm) to produce a rolled sheet. Pressed plates (thickness 0.5 mm) are then produced from the rolled sheet in a heated high-pressure press (heating temperature 195° C., heating time 5 minutes). The pressed plates are cooled for 5 minutes by means of water cooling. Pressed plates measured immediately after production have a volume resistance $R_D$ (measured according to DIN 53482 using a guard-ring electrode 20 $cm^2$, gap 5 mm, after 5 minutes at 500 volts) of $4.5 \times 10^{10}$ Ω which, after 14 days' storage in air (50% relative humidity), falls to $2.0 \times 10^9$ Ω. The surface resistance $R_o$ (measured using the same guard-ring electrode) after production is $6.0 \times 10^{10}$ Ω, and after 14 days' storage in air (50% relative humidity) is $5.0 \times 10^9$ Ω.

EXAMPLE 2
Preparation of Antistatic Soft PVC 50 g of soft PVC, 100 parts of EVIPOL® SH 7020, 48 parts of dioctyl phthalate, 2 parts of epoxidised soybean oil (Reoplast® 39), 2 parts of BZ 561, 0.15 g of polyether ester amide (Pelestat® 7490 of Sanyo Chemicals) to which 3% by weight of $NaClO_4.H_2O$ has been added, and 4.5 g of polyamide 6,6 flocks (length 1.5 mm, 2.2 dtex) are mixed using a spatula. The mixture is processed on a two-roll calender at 180° C. (rolling time 5 minutes, speed 22/26 revs/min, nip 0.5 mm) to produce a rolled sheet. Immediately after production the rolled sheet has a volume resistance $R_D$ (measured according to DIN 53482 using a guard-ring electrode 20 $cm^2$, gap 5 mm, after 5 minutes at 500 volts) of $3 \times 10^{10}$ Ω which, after 14 days' storage in air (50% relative humidity), falls to $3 \times 10^9$ Ω. The surface resistance $R_o$ (measured using the same guard-ring electrode) after production is $3 \times 10^{11}$ Ω, and after 14 days' storage in air (50% relative humidity) is $2 \times 10^{10}$ Ω.

EXAMPLE 3
Production of Antistatic Polypropylene 194 g of polypropylene (Moplen® FLF 20, stabilised), 2.88 g of polyether ester amide (Pelestat® 6321 powder of Sanyo Chemicals), 3.00 g of polyamide 6 flocks (1.8 mm, 11.0 dtex) and 0.12 g of $NaClO_4.H_2O$ are mixed for 3 minutes in a mixer, subsequently extruded at 230° C. using a single-screw extruder (BRABENDER 25 D) and then granulated. Pressed plates produced at 200° C. and 300 bar exhibited a volume resistance $R_D$ (measured according to DIN 53482 using a guard-ring electrode 20 cm², gap 5 mm, after 5 minutes at 500 volts) of $5.5 \times 10^9$ Ω and a surface resistance $R_o$ (measured using the same guard-ring electrode) of $4.0 \times 10^{10}$ Ω after cooling with water and 2 days' storage (60% relative humidity).

EXAMPLE 4
Preparation of an Antistatic Mixture in the Form of Coated Fibres 3.33 g of polyether ester amide (Pelestat® 7490 of Sanyo Chemicals) are dissolved in 160 g of methanol. 13.33 g of polyamide 6 fibres (length 1.8 mm, 11 dtex) and a solution consisting of 3.20 g of polyethylene glycol 600 dimethacrylate and 0.13 g of $NaClO_4.H_2O$ are added thereto. The methanol is evaporated off at 40° C. under a vacuum of approximately 10 mbar. The coated fibres are then dried at 40° C. and 0.7 mbar for 5 hours.

EXAMPLE 5
Rendering Polypropylene Antistatic

Polypropylene and the antistatic mixture in the form of coated fibres described in Example 4 are mixed with one another in various ratios. The mixtures are extruded in a single-screw extruder (Brabender 25 D). The temperature of the composition at the extruder die is approximately 236° C. The extruded polypropylene is granulated and compressed at 200° C. to form plates. The lateral layer resistance $R_o$ (DIN 53482) of those plates, each 0.57 mm thick, is measured by a spring reed electrode at 22° C. and 50% relative humidity. The mixing ratios and measurement results are given in Table 1.

TABLE 1

| Example | Polypropylene [parts] | coated fibres [parts] | $R_o$ [ohm] |
| --- | --- | --- | --- |
| reference | 100 | 0 | $4 \times 10^{15}$ |
| 5a | 98 | 2 | $4.1 \times 10^{12}$ |
| 5b | 97 | 3 | $1.5 \times 10^{11}$ |
| 5c | 96 | 4 | $3.5 \times 10^{10}$ |
| 5d | 95 | 5 | $6.4 \times 10^9$ |

EXAMPLE 6
Preparation of an Antistatic Mixture in the Form of a Polymer Blend 50 g of polyamide 6,6 powder, 49 g of poly(ether ester amide) (Pelestat® 7490, of Sanyo Chemicals) and 1.0 g of $NaClO_4.H_2O$ are mixed together. The mixture is extruded in a single-screw extruder (Brabender 25 D). The temperature of the composition at the extruder die is approximately 239° C. The polymer blend is granulated and then dried for 30 minutes at 70° C. The granules consist of fibrous, crystalline and amorphous regions.

EXAMPLE 7
Rendering Hard PVC Antistatic 55.2 g of hard PVC and 4.8 g of the antistatic mixture in the form of a polymer blend described in Example 6 are mixed together. The mixture is mixed on a two-roll rolling mill for 5 minutes at roll temperatures of 197° C. (front) and 193° C. (rear). The rolled sheet obtained is compressed at 195° C. to form a plate. The lateral layer resistance $R_o$ of the 0.6 mm thick plate is measured at 22° C. and 50% relative humidity using a spring reed electrode and is $1 \times 10^{11}$ ohm.

EXAMPLE 8
Preparation of Antistatic HD Polyethylene 55.8 g of HD-PE Hostalen® GF 7660 (Hoechst), 0.6 g of polyether ester amide (Pebax® MH 1657 of Elf-Atochem S.A.) to which 5% by weight of $NaClO_4.H_2O$ has been added, and 3.6 g of polyamide 6,6 flocks (length 0.6 mm, 0.9 dtex) are mixed using a spatula. The mixture is processed on a two-roll calender at 175° C. (rolling time 5 minutes, speed 22/26 revs/min, nip 0.5 mm) to produce a rolled sheet. 0.5 mm thick pressed plates are then produced from the rolled sheet in a heated high-pressure press (heating temperature 180° C., heating time 5 minutes). The pressed plates are cooled under pressure in a second, water-cooled press (5 minutes). One day after production the plates have a volume resistance $R_D$ at 20% relative humidity (measured by a guard-ring electrode according to DIN 53482, 20 cm², gap 5 mm, after 5 minutes at 500 volts) of $1 \times 10^{10}$ ohm which, after one week's storage in air at approximately 40% relative humidity, falls to $3 \times 10^9$ ohm. The surface resistance $R_o$ (measured using the same guard-ring electrode) is $1.2 \times 10^{11}$ ohm (20% relative humidity) and $5 \times 10^{10}$ ohm (approximately 40% relative humidity, after one week). The plates are white-opaque.

EXAMPLE 9
Production of Antistatic HD Polyethylene 55.2 g of HD-PE Hostalen® GF 7660 (Hoechst), 1.2 g of polyether ester amide (Pebax® MH 1657 of Elf-Atochem S.A.) to which 5% by weight of $NaClO_4.H_2O$ has been added, and 3.6 g of aramide fibre type F AR 700/75 (of Schwarzwälder Textilwerke, D-7771 Schenkenzell) are mixed using a spatula. The mixture is processed on a two-roll calender at 160° C. (5 minutes rolling time, speed 28/36 revs/min, nip 0.5 mm) to produce a rolled sheet. 0.5 mm thick pressed plates are produced from the rolled sheet in a heated high-pressure press (heating temperature 180° C., heating time 5 minutes). The pressed plates are cooled under pressure in a second, water-cooled press (5 minutes). Shortly after production, a plate has a volume resistance $R_D$ at 20% relative humidity (measured by a guard-ring electrode according to DIN 53482, 20 cm², gap 5 mm, after 5 minutes at 500 volts) of $2.5 \times 10^9$ ohm which, after one week's storage at approximately 50% relative humidity, falls to $1.3 \times 10^9$ ohm. The surface resistance $R_o$ is $2.3 \times 10^{10}$ ohm (at 20% relative humidity) and, after 1 week's storage in air (50% relative humidity), is $1.0 \times 10^{10}$ ohm. The plate is yellowish-opaque owing to the yellow aramide fibres.

EXAMPLE 10
Production of Antistatic HD Polyethylene 55.8 g of HD-PE Hostalen® GF 7660 (Hoechst), 0.6 g of polyether ester amide (Pelestat® 6321 of Sanyo Chemicals) to which 10% by weight of $NaClO_4.H_2O$ has been added, and 3.6 g of polyamide 6 flocks (length 1.8 mm, 11 dtex) are mixed using a spatula. The mixture is processed on a two-roll calender at 160° C. (8 min. rolling time, speed 22/26 revs/min, nip 0.5 mm) to produce a rolled sheet. A 0.5 mm thick pressed plate is produced from the rolled sheet in a heated high-pressure press (heating time 5 minutes at 165° C.). The plate is cooled under pressure in a second, water-cooled press (5 minutes). One day after production, the volume resistance $R_D$ of the plate (measured by a guard-ring electrode according to DIN 53482) is $2 \times 10^{12}$ ohm (20% relative humidity), and after four months' storage in air it is $4 \times 10^{10}$ ohm (48% relative humidity). The surface resistance $R_o$ after production is $2.3 \times 10^{13}$ ohm (20% relative humidity) and after 4 months' storage in air (48% relative humidity) is $2 \times 10^{12}$ ohm.

EXAMPLE 11
Production of Antistatic Styrene/butadiene Block Copolymer 55.9 g of SB block copolymer (Styrolux® RE 31, BASF), 0.48 g of polyether ester amide (Pebax® MH 1657, Elf-Atochem S.A.) to which 5% by weight of $NaClO_4 \cdot H_2O$ has been added, and 3.6 g of polyamide 66 flocks (length 0.6 mm, 0.9 dtex) are mixed using a spatula. The mixture is processed on a two-roll calender at 190° C. (rolling time 5 min., speed 26/32 revs/min, nip 0.5 mm). A 0.5 mm thick pressed plate is produced from the resulting homogeneous mass in a heated high-pressure press (heating time 5 min. at 195° C.). The plate is cooled under pressure in a second, water-cooled press (5 min.). Shortly after production, the plate has a volume resistance $R_D$ of $2 \times 10^{11}$ ohm and a surface resistance $R_o$ of $4 \times 10^{11}$ ohm (at 20% relative humidity). After one day's storage in air, the volume resistance $R_D$ is $3 \times 10^{10}$ ohm and the surface resistance $R_o$ is $8 \times 10^{10}$ ohm (48% relative humidity). The measurements are carried out according to DIN 53482 using a guard-ring electrode (20 cm², gap 5 mm, after 5 min. at 500 volts).

EXAMPLE 12
Production of Antistatic PPE/PA Blend 55.2 g of PPE/PA blend (Hamamatsu-CHO, Japan), 1.2 g of polyether ester amide (Pebax® MH 1657 of Elf-Atochem S.A.) to which 5% by weight of $NaClO_4 \cdot H_2O$ has been added, and 3.6 g of polyamide 66 flocks (length 0.6 mm, 0.9 dtex) are mixed using a spatula. The mixture is processed on a two-roll calender at 230° C. (rolling time 5 min., speed 22/26 revs/min., nip 0.5 mm). A 0.5 mm thick pressed plate is produced from the resulting mass in a heated high-pressure press (heating time 5 min. at 235° C.). The plate is cooled under pressure in a second, water-cooled press (5 min.). The volume resistance $R_D$ of the plate is $1.6 \times 10^{12}$ ohm at 20% relative humidity one day after production and is $6 \times 10^{11}$ ohm after one week's storage in air (50% relative humidity). The values for the surface resistance $R_o$ are $7 \times 10^{12}$ ohm (20% relative humidity) and $4 \times 10^{12}$ ohm (50% relative humidity). The measurements are carried out with a guard-ring electrode according to DIN 53482.

EXAMPLE 13
Production of Antistatic Hard PVC 60 g of hard PVC (Evipol® SH 7020 stable, EVC European Vinyls Corporation AG), 1.4 g of polyether ester amide (Pelestat® 7490 of Sanyo Chemicals) to which 10% $NaClO_4 \cdot H_2O$ has been added, and 4.0 g of aramide fibres type F AR 700/40 (Schwarzwälder Textilwerke D-7771 Schenkenzell) are mixed using a spatula. The mixture is processed on a two-roll calender to produce a rolled sheet (rolling time 5 min. at 190° C., speed 22/26 revs/min., nip 0.5 mm). 0.5 mm thick pressed plates are produced from the rolled sheet using a heated high-pressure press (heating time 5 min. at 195° C.). The plates are cooled under pressure using a second, water-cooled press (5 min.). Shortly after production, a pressed plate has a volume resistance $R_D$ of $1.3 \times 10^{12}$ ohm and a surface resistance $R_o$ of $2 \times 10^{12}$ ohm (55% relative humidity). After one week's storage in air, $R_D$ is $2 \times 10^{11}$ ohm and $R_o$ is $4 \times 10^{11}$ ohm (approximately 55% relative humidity). The measurements are carried out according to DIN 53482 using a guard-ring electrode. The plates are yellowish owing to the yellow aramide fibres used.

EXAMPLE 14
Production of Antistatic ABS 54 g of ABS Cycolac® TCA (GEP), 3 g of polyether ester amide (Pelestat® 7490 of Sanyo Chemicals, Japan) to which 10% by weight of $LiCF_3SO_3$ has been added, and 3 g of polyamide 6,6 flocks (length 2 mm, 1.7 dtex) are mixed using a spatula and processed on a two-roll calender to produce a rolled sheet (rolling time 5 min. at 170° C., speed 22/26 revs/min., nip 0.5 mm). A 0.5 mm thick pressed plate is produced from the rolled sheet in a heated high-pressure press (heating time 5 min. at 175° C.). The plate is cooled under pressure in a second, water-cooled press (5 min.). Directly after production, the conductivity is ascertained at 20% relative humidity according to DIN 53482 using a guard-ring electrode: volume resistance $R_D$ $3.2 \times 10^{10}$ ohm, surface resistance $R_o$ $7.4 \times 10^{10}$ ohm. After one week's storage in air (approximately 55% relative humidity), $R_D$ is $3.1 \times 10^9$ ohm and $R_o$ is $1.3 \times 10^{10}$ ohm.

EXAMPLE 15
Production of Antistatic ABS 54 g of ABS Cycolac® TCA (GEP), 2.4 g of polyether ester amide (Pebax® MH 1657 of Elf-Atochem S.A.) to which 5% by weight of $NaClO_4 \cdot H_2O$ has been added, and 3.6 g of aramide fibres type F AR 700/075 (Schwarzwälder Textilwerke, D-7771 Schenkenzell) are mixed using a spatula and processed to produce a rolled sheet (rolling time 5 min. at 175° C., speed 28/36 revs/min., nip 0.5 mm). A 0.5 mm thick pressed plate is produced from the rolled sheet using a heated high-pressure press (heating time 5 min. at 185° C.). Using a second, water-cooled press, the plate is cooled under pressure for 5 min. Directly after production the conductivity is ascertained at 20% relative humidity according to DIN 53482 using a guard-ring electrode: volume resistance $R_D$ $4 \times 10^{10}$ ohm, surface resistance $R_o$ $3 \times 10^{11}$ ohm. After one week's storage in air (50% relative humidity), $R_D$ is $2.6 \times 10^{10}$ ohm and $R_o$ is $2.7 \times 10^{10}$ ohm. The plate is yellowish, owing to the yellow aramide fibres.

EXAMPLE 16
Production of Antistatic LLD-polyethylene 54.6 g of LLD-PE Dowlex® 2045 E (DOW Chemicals), 1.8 g of polyether ester amide (Pebax® MH 1657 of Elf-Atochem S.A.) to which 5% by weight of $NaClO_4 \cdot H_2O$ has been added, and 3.6 g of polyamide 6,6 flocks (length 0.6 mm, 0.9 dtex) are mixed using a spatula and processed on a two-roll calender to produce a rolled sheet (rolling time 5 min. at 180° C., speed 22/26 revs/min., nip 0.5 mm). A 0.5 mm thick pressed plate is produced from the rolled sheet in a heated high-pressure press (heating time 5 min. at 190° C.). The plate is cooled under pressure using a second, water-cooled press (5 min.). After three days' storage at 20% relative humidity the pressed plate has a volume resistance $R_D$ of $2 \times 10^9$ ohm and a surface resistance $R_o$ of $1.3 \times 10^{10}$ ohm. After one week's storage in air at 50% relative humidity $R_D$ is $7 \times 10^8$ ohm and $R_o$ is $4 \times 10^9$ ohm. The measurements are carried out according to DIN 53482 using a guard-ring electrode.

EXAMPLE 17
Production of Antistatic Polypropylene 192 g of polypropylene (Profax® 6501, stabilised), 3.84 g of polyether ester amide (Pelestat® 6321 of Sanyo Chemicals, Japan), 4.00 g of polyamide 6 flocks (1.8 mm, 11.0 dtex) and 0.16 g of $NaClO_4 \cdot H_2O$ were mixed for 2 minutes in a mixer, then extruded at 285° C. using a single-screw extruder (BRABENDER 25 D), and subsequently granulated. Pressed plates produced at 260° C. and 300 bar exhibited a volume resistance $R_D$ (measured according to DIN 53482 using a guard-ring electrode 20 cm$^2$, gap 5 mm, after 5 minutes at 500 volts) of $1.9\times10^{10}$ Ω and a surface resistance $R_o$ (measured using the same guard-ring electrode) of $1.7\times10^{12}$ Ω after water-cooling and 8 days' storage (58% relative humidity, 23° C.)

EXAMPLE 18
Production of Antistatic Polypropylene 190 g of polypropylene (Profax® 6501, stabilised), 4.80 g of polyether ester amide (Pebax® MH 1657 powder, Elf Atochem, France), 5.00 g of polyamide 66 powder (Ultramid® AS 2500S) and 0.2 g of NaClO$_4$.H$_2$O were mixed for 3 minutes in a mixer, then extruded at 245° C. using a single-screw extruder (BRABENDER 25 D), and subsequently granulated. Pressed plates produced at 200° C. and 300 bar exhibited a volume resistance $R_D$ (measured according to DIN 53482 using a guard-ring electrode 20 cm$^2$, gap 5 mm, after 5 minutes at 500 volts) of $1.1\times10^{10}$ Ω and a surface resistance $R_o$ (measured using the same guard-ring electrode) of $7.7\times10^{10}$ Ω after water-cooling and 2 days' storage (51% relative humidity, 23° C.).

EXAMPLE 19
Production of Antistatic Polystyrene 191.8 g of polystyrene (polystyrene 168 N, BASF), 3.84 g of poly(ether ester amide) (Pelestat® 6321 powder, Sanyo Chemicals, Japan), 4.00 g of polyamide 6 flocks (length 1.8 mm, 11 dtex), 0.16 g of NaClO$_4$.H$_2$O and 0.20 g of Irganox® 900 FF (Ciba Specialty Chemicals) were mixed for 3 minutes in a mixer, then extruded at 210° C. using a single-screw extruder (BRABENDER 25 D), and subsequently granulated. Pressed plates produced at 200° C. and 300 bar exhibited a volume resistance $R_D$ (measured according to DIN 53482 using a guard-ring electrode 20 cm$^2$, gap 5 mm, after 5 minutes at 500 volts) of $8.7\times10^{11}$ Ω and a surface resistance $R_o$ (measured using the same guard-ring electrode) of $3.2\times10^{11}$ Ω after water-cooling and 2 days' storage (40% relative humidity, 23° C.).

EXAMPLE 20
Production of Antistatic Polystyrene 189.8 g of polystyrene (polystyrene 168 N, BASF), 4.80 g of poly(ether ester amide) (Pelestat® 6321 of Sanyo Chemicals, Japan), 5.00 g of polyamide 66 powder (Ultramid® AS 2500S), 0.20 g of NaClO$_4$.H$_2$O and 0.20 g of Irganox® 900 FF (Ciba Specialty Chemicals) were mixed for 3 minutes in a mixer, then extruded at 235° C. using a single-screw extruder (BRABENDER 25 D), and subsequently granulated. Pressed plates produced at 230° C. and 300 bar exhibited a volume resistance $R_D$ (measured according to DIN 53482 using a guard-ring electrode 20 cm$^2$, gap 5 mm, after 5 minutes at 500 volts) of $93.2\times10^{10}$ Ω and a surface resistance $R_o$ (measured using the same guard-ring electrode) of $9.2\times10^{10}$ Ω after water-cooling and 2 days' storage (48% relative humidity, 23° C.).

What is claimed is:

1. A composition comprising a thermoplastic or elastomeric polymeric substrate-forming material (A) and an antistatic mixture (B) in the form of contiguous fibres, which mixture comprises
   (b1) an organic polymeric material that is fibrous or forms fibres on mixing and is not soluble in the thermoplastic or elastomeric polymeric substrate-forming material (A) which is selected from the group consisting of a polyacrylic acid ester, polymethacrylic acid ester, polyacrylonitrile, polyvinyl alchol, polyvinyl acetate, polyamide, polyurethane or polyester;
   (b2) a polymer or copolymer capable of ionic charge conduction that has blocks for complexing or solvating a salt of an inorganic protonic acid, which is selected from the group consisting of polyether urea, polyether amide, polyether ester amide or polyether ester; and
   (b3) a salt selected from the group consisting of LiClO$_4$, LiCF$_3$SO$_3$, NaClO$_4$, LiBF$_4$, NaBF$_4$, KBF$_4$, NaCF$_3$SO$_3$, KClO$_4$, KPF$_6$, KCF$_3$SO$_3$, KC$_4$F$_9$SO$_3$, Ca(ClO$_4$)$_2$, Ca(PF$_6$)$_2$, Mg(ClO$_4$)$_2$, Mg(CF$_3$SO$_3$)$_2$, Zn(ClO$_4$)$_2$, Zn(PF$_6$)$_2$ or Ca(CF$_3$SO$_3$)$_2$, that has been complexed or solvated in the polymer or copolymer (b2).

2. A composition according to claim 1, wherein component (A) is a polyolefin, a polystyrene, a copolymer of acrylonitrile/butadiene/styrene (ABS), a polymer of α,β-unsaturated acids, a halogen-containing polymer, a homo- or co-polymer of cyclic ethers, a polymer of unsaturated alcohols and amines, a polyacetal, a polyphenylene oxide, a polyurethane, a polyamide, a polyester, a polyurea, a polycarbonate, a polysulfone or natural rubber.

3. A composition according to claim 2, wherein component (A) is a polyolefin, a polystyrene, an acrylonitrile/butadiene/styrene (ABS) copolymer, a polymer of α,β-unsaturated acids, a halogen-containing polymer or a homo- or co-polymer of cyclic ethers.

4. A composition according to claim 3, wherein component (A) is polyvinyl chloride (PVC), polyethylene, polystyrene or polypropylene.

5. A composition according to claim 1, wherein the polymeric material (b1) that is fibrous or forms fibres on mixing is a polyester, polyamide (x) or polyamide (x,y) in which x and y are each independently a number from 4 to 14.

6. A composition according to claim 1, wherein the polymer or copolymer (b2) is a block copolymer polyether ester amide in which the polyether segments consist of polyethylene glycol units having a molecular weight $M_n$ of from 200 to 6000 daltons and the polyamide segments consist of polyamide (x) or polyamide (x,y) having a molecular weight $M_n$ of from 200 to 6000 daltons, x and y being a number from 4 to 14.

7. A composition according to claim 1, wherein the inorganic salt (b3) is present in an amount of from 0.05 to 10% by weight, based on the copolymer (b2).

8. A composition according to claim 7, wherein the inorganic salt (b3) is present in an amount of from 0.5 to 5% by weight, based on the copolymer (b2).

9. A composition according to claim 1, wherein the ratio by mass of organic polymeric material (b1) that is fibrous or forms fibres on mixing to copolymer (b2) is from 20:1 to 1:10.

10. A composition according to claim 9, wherein the ratio by mass of organic polymeric material (b1) that is fibrous or forms fibres on mixing to copolymer (b2) is from 10:1 to 1:3.

11. A composition according to claim 1, wherein the antistatically active mixture of components (b1), (b2) and (b3) is present in a total amount of from 0.1 to 15% by weight, based on the thermoplastic or elastomeric polymeric substrate.

12. A composition according to claim 1, wherein the thermoplastic or elastomeric polymeric substrate (A) is PVC, polyethylene or polypropylene, the fibrous or fibre-forming organic polymeric material (b1) is a polyester or a polyamide, the copolymer (b2) capable of ion conduction is a polyether ester amide or a polyether ester and the inorganic salt of a protonic acid (b3) is NaClO$_4$, KPF$_6$ or LiCF$_3$SO$_3$.

13. An antistatic mixture for a thermoplastic or elastomeric polymeric-substrate forming material comprising
   (b1) an organic polymeric material that is fibrous or forms fibres on mixing and is not soluble in thermoplastic or elastomeric polymeric substrate-forming material (A) which is selected from the group consisting of a polyacrylic acid ester, polymethacrylic acid ester, polyacrylonitrile, polyvinyl alcohol, polyvinyl acetate, polyamide, polyurethane or polyester;

(b2) a polymer or copolymer capable of ionic charge conduction that has blocks for complexing or solvating a salt of an inorganic protonic acid, which is selected from the group consisting of polyether urea, polyether amide, polyether ester amide or polyether ester; and (b3) a salt selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ or $Ca(CF_3SO_3)_2$, that has been complexed or solvated in the polymer or copolymer (b2).

14. A process for the preparation of an antistatic thermoplastic or elastomeric polymeric substrate-forming material (A) which comprises incorporating an antistatic mixture (B) comprising (b1) an organic polymeric material that is fibrous or forms fibres on mixing and is not soluble in the thermoplastic or elastomeric polymeric substrate-forming material (A) which is selected from the group consisting of a polyacrylic acid ester, polymethacrylic acid ester, polyacrylonitrile, polyvinyl alchol, polyvinyl acetate, polyamide, polyurethane or polyester;

(b2) a polymer or copolymer capable of ionic charge conduction that has blocks for complexing or solvating a salt of an inorganic protonic acid, which is selected from the group consisting of polyether urea, polyether amide, polyether ester amide or polyether ester; and (b3) a salt selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ or $Ca(CF_3SO_3)_2$, that has been complexed or solvated in the polymer or copolymer (b2).

* * * * *